(No Model.)

R. B. CORCORAN.

HORSESHOE.

No. 327,772. Patented Oct. 6, 1885.

WITNESSES
P. W. Hale
F. L. Browne

INVENTOR
Richard B. Corcoran
By Jno Ell & ally
Attorney

UNITED STATES PATENT OFFICE.

RICHARD B. CORCORAN, OF FORT CUSTER, MONTANA TERRITORY.

HORSESHOE.

SPECIFICATION forming part of Letters Patent No. 327,772, dated October 6, 1885.

Application filed June 17, 1885. Serial No. 168,931. (No model.)

*To all whom it may concern:*

Be it known that I, RICHARD B. CORCORAN, a citizen of the United States, residing at Fort Custer, in the county of Custer and Territory of Montana, have invented certain new and useful Improvements in Horseshoes; and I do hereby declare the following to be a full, clear, and exact description of the invention, such as will enable others skilled in the art to which it appertains to make and use the same.

It is well known that horses' feet are subject to many and various diseases which arise from the application and use of shoes; and as now constructed, stones and similar small objects, snow and dirt, are caught in between the arms thereof, which are very difficult to remove, causing much annoyance to the driver, and endangering the horse's hoof to bruises and strains and subsequent disease.

The object of my present invention is to so construct the shoe that liability to these things is entirely avoided.

The invention consists in making the shoe to extend only a portion of and preferably about three-fourths the usual length, beginning from the toe portion, and applying the same in the manner as will be hereinafter described.

Figure 1:
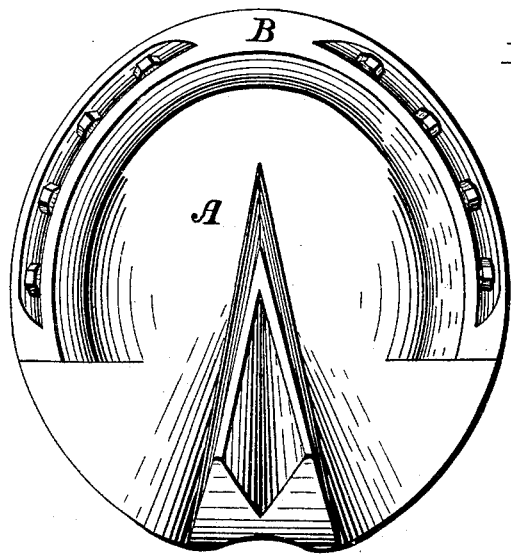
Figure 2:
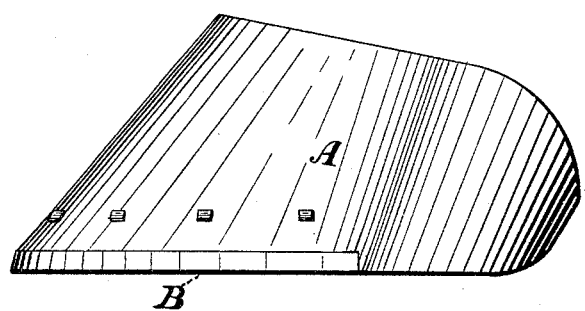

In the accompanying drawings, in which similar letters of reference indicate like parts, Figure 1 is a bottom plan view of a horse's hoof provided with a shoe constructed and applied in accordance with my invention. Fig. 2 is a side view.

The letter A indicates the hoof, and B the shoe, the arms of which, as shown, extend only about three-fourths the length of the hoof.

In applying the shoe the hoof may be trimmed or cut out, as indicated in Fig. 2, to sink the shoe below the normal level of the hoof, which is then applied with nails as usual.

It will be thus seen that the foot with the shoe is substantially as flat on its under side as in its natural condition. The frog and quarters will therefore rest upon the ground as in nature, and the feet thus receive the natural pressure and friction which are essential to their healthful condition, and as the rear portion of the foot is the most sensitive it will be seen that that portion is particularly well preserved.

The shoe being attached to the non-expanding portion of the hoof, also renders it less liable to cracking and disease.

When the hoof is provided with my shoe, the frog projects beyond the general plane of the bottom of the hoof, and thus it acts as a friction device to prevent slipping.

The usual calks are entirely omitted from my shoe, thus saving much in their manufacture.

My shoe can obviously be made and applied with much less expense than can the ordinary shoe.

What I claim as my invention, and desire to secure by Letters Patent, is—

1. A horseshoe extending backward from the toe portion of the hoof only a portion of the length of said hoof, whereby the frog and quarters of the hoof rest upon the ground as in their natural state, substantially as described.

2. A horseshoe made about three-fourths the length of the hoof, beginning with the toe portion, substantially as described.

3. A horseshoe constructed to extend backward from the toe portion of the hoof only a part of the length of said hoof, and countersunk therein to preserve the general plane of the under side of a natural hoof, substantially as described.

In testimony whereof I affix my signature in presence of two witnesses.

RICHARD B. CORCORAN.

Witnesses:
CHARLES W. BORUP,
E. HERRMANN.